July 19, 1938.  C. S. MURCH  2,124,259
FROST ABSORBER
Filed May 11, 1936
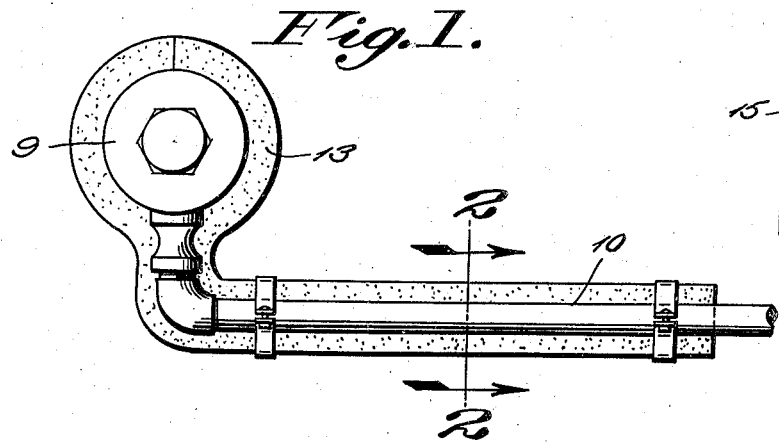
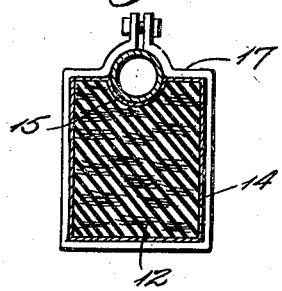
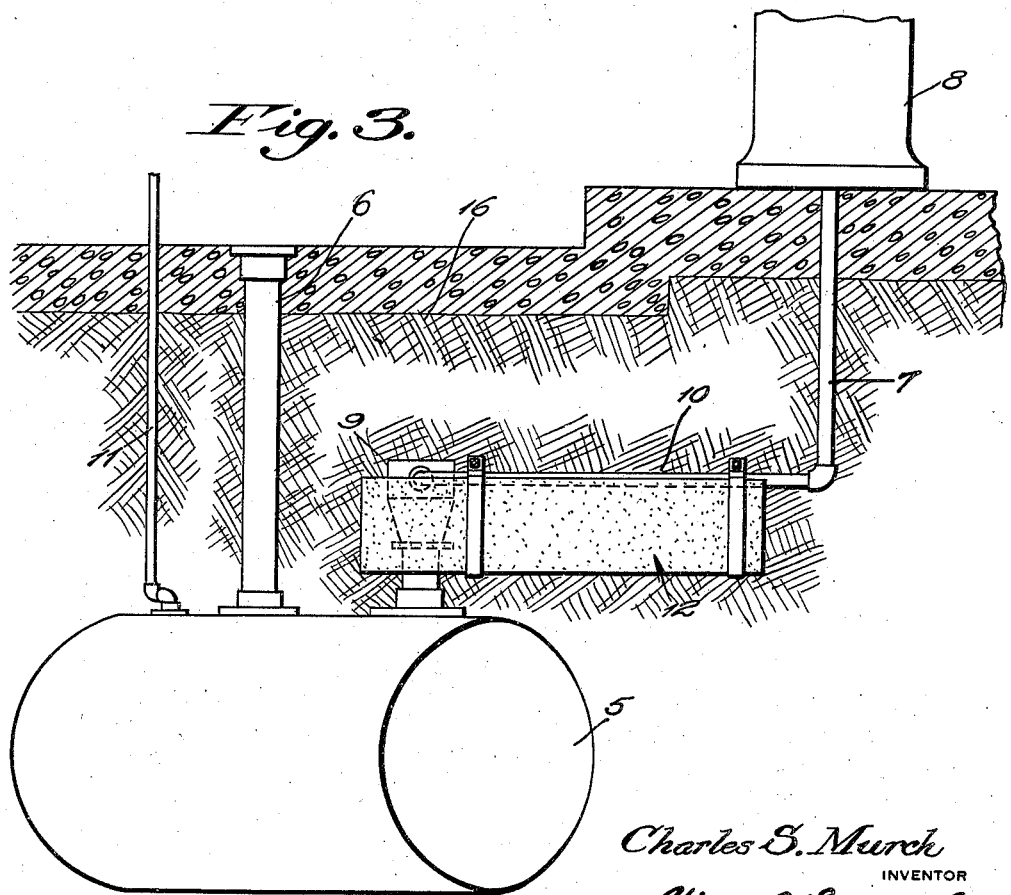
Charles S. Murch
INVENTOR
BY Victor J. Evans & Co.
ATTORNEYS
WITNESS Patented July 19, 1938

2,124,259

UNITED STATES PATENT OFFICE 2,124,259

FROST ABSORBER

Charles S. Murch, Augusta, Maine

Application May 11, 1936, Serial No. 79,140

1 Claim. (Cl. 137—69)

The invention relates to a frost absorber and more especially to a resilient cushioning device for use in connection with piping beneath ground.

The primary object of the invention is the provision of a device of this character, wherein the same when applied to a lead to or from a gasoline tank buried within the ground to a pump above ground will eliminate the breaking of the joints of the piping resultant from frost penetrating the ground as the latter is caused to expand and thereby affecting or distorting the lay of the pipe which damages the joints or connections therewith.

A further object of the invention is the provision of a device of this character, which is comparatively simple in its make-up, readily and easily applied to a piping, thoroughly reliable and efficient in operation and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary plan view showing a pipe lay with the device constructed in accordance with the invention applied thereto.

Figure 2 is an enlarged sectional view on the line 2—2 of Figure 1 looking in the direction of the arrows.

Figure 3 is a fragmentary vertical sectional view showing a gas tank and a portion of a gasoline pump with the connections between the same and the device applied beneath ground.

Similar reference characters indicate corresponding parts throughout the several views in the drawing.

Referring to the drawing in detail, 5 designates a gasoline tank for the storage of gasoline, the same as usual being sunken in the ground beneath the surface thereof the required distance and leading to this tank is the filling pipe 6, it being accessible at the surface of the ground for the filling of the said tank.

Leading from the tank 5 is a feed pipe 7 which is connected with a gasoline pump, a portion being indicated at 8, and included with this pipe is a check return valve casing 9, the pipe 7 being suitably elbowed to give a horizontal run 10 next to the valve casing 9.

The tank 5 also has associated therewith a vent tube 11.

Beneath the horizontal run 10 of the pipe 7 is a soft rubber section 12 having the enveloping portion 13 to embrace the valve 9 and such section 12 and portion 13 are incased with a waterproof casement 14, the latter with the section 12 being provided with a seat 15 for the horizontal lay 10 of the pipe 7 and the purpose of the section 12 with the portion 13 is to absorb disturbances against the pipe 7 resultant from frost penetrating the ground 16 below the surface thereof as such frost will expand the earth and this pressure would be directed against the pipe 7 and if not relieved would have a tendency to break the joints or connections thereof between the tank 5 and the pump 8. The section 12 and portion 13 act as a cushion to relieve the pressure of the earth when frost penetrates the same against the pipe 7, particularly the lay 10 thereof and in this manner eliminating damage to the equipment. The section 12 is held fixed with relation to the pipe 7 by strap clamps 17.

What is claimed is:

A frost absorber and cushioning means for underground piping and valve set-up therewith, comprising a section of soft rubber having in the uppermost face thereof a seat for the underground pipe and also provided with a pocket for the valve, the said section being relatively wide to protrude laterally beyond opposite sides of the pipe and valve, a waterproof casement about said section and entirely enveloping the same, strap loops embracing the casement and pipe at spaced intervals thereof, and fasteners engaged with the strap loops for securing the same in embracing position.

CHARLES S. MURCH.